(12) United States Patent
Leeman, Jr.

(10) Patent No.: US 8,763,003 B2
(45) Date of Patent: *Jun. 24, 2014

(54) METHODS AND APPARATUS FOR DETECTING DEADLOCK IN MULTITHREADING PROGRAMS

(75) Inventor: George B. Leeman, Jr., Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/426,102

(22) Filed: Mar. 21, 2012

(65) Prior Publication Data

US 2012/0180065 A1 Jul. 12, 2012

Related U.S. Application Data

(63) Continuation of application No. 12/056,646, filed on Mar. 27, 2008, now Pat. No. 8,230,437, which is a continuation of application No. 11/315,855, filed on Dec. 22, 2005, now abandoned.

(51) Int. Cl.
G06F 9/46 (2006.01)

(52) U.S. Cl.
USPC ............................ 718/104; 718/107; 717/133

(58) Field of Classification Search
None
See application file for complete search history.

(56) References Cited

U.S. PATENT DOCUMENTS

| | | | | |
|---|---|---|---|---|
| 5,606,698 A * | 2/1997 | Powell | ........................... | 717/161 |
| 5,822,588 A * | 10/1998 | Sterling et al. | ................ | 717/131 |
| 6,035,321 A * | 3/2000 | Mays | ........................... | 718/103 |
| 6,226,787 B1 * | 5/2001 | Serra et al. | ..................... | 717/125 |
| 6,542,921 B1 * | 4/2003 | Sager | ............................ | 718/108 |
| 6,593,940 B1 * | 7/2003 | Petersen et al. | ................ | 715/700 |
| 6,883,165 B1 * | 4/2005 | Blandy et al. | .................. | 717/148 |
| 6,928,647 B2 * | 8/2005 | Sager | ............................ | 718/108 |
| 7,093,262 B2 * | 8/2006 | Ma et al. | ....................... | 719/310 |
| 7,124,405 B1 * | 10/2006 | Kakivaya et al. | ............. | 717/143 |
| 7,219,348 B2 * | 5/2007 | Tudor | ............................ | 718/107 |
| 7,496,918 B1 * | 2/2009 | Dice et al. | ..................... | 718/100 |
| 7,546,593 B2 * | 6/2009 | Petev et al. | ................... | 717/166 |
| 7,657,894 B2 * | 2/2010 | Ma | ................................ | 718/104 |
| 7,743,382 B2 * | 6/2010 | Schumacher et al. | ........ | 718/106 |
| 7,784,035 B2 * | 8/2010 | Kahlon et al. | ................ | 717/133 |
| 7,840,949 B2 * | 11/2010 | Schumacher et al. | ........ | 717/149 |
| 2003/0154235 A1 * | 8/2003 | Sager | ............................ | 709/108 |
| 2006/0053422 A1 * | 3/2006 | Alikacem et al. | ............. | 718/100 |
| 2006/0070076 A1 * | 3/2006 | Ma | ................................ | 718/104 |
| 2007/0011671 A1 * | 1/2007 | Kahlon et al. | ................ | 717/170 |
| 2007/0271562 A1 * | 11/2007 | Schumacher et al. | ........ | 718/100 |

OTHER PUBLICATIONS

Wimmer et al. "Using Barrier Graphs for Deadlock Prevention in Communication Networks", 1984 IEEE, pp. 897-901.*

(Continued)

*Primary Examiner* — Van Nguyen

(74) *Attorney, Agent, or Firm* — Preston J. Young; Ryan, Mason & Lewis, LLP

(57) ABSTRACT

A method of detecting deadlock in a multithreading program is provided. An invocation graph is constructed having a single root and a plurality of nodes corresponding to one or more functions written in code of the multithreading program. A resource graph is computed in accordance with one or more resource sets in effect at each node of the invocation graph. It is determined whether cycles exist between two or more nodes of the resource graph. A cycle is an indication of deadlock in the multithreading program.

19 Claims, 7 Drawing Sheets

(56) References Cited

OTHER PUBLICATIONS

Cahit "Deadlock Detection Using (0, 1)-Labelling of Resource Allocation Graphs", 1998 IEEE, pp. 68-72.*
Gligor et al. "On Deadlock Detection in Distributed Systems", 1980 IEEE, pp. 435-440.*
Cho et al. "Graph-Theoretic Deadlock Detection and Resolution for Flexible Manufacturing Systems", 1995 IEEE, pp. 413-421.*
Viswanadham et al. "Deadlock Prevention and Deadlock Avoidance in Flexible Manufacturing Systems Using Petri Net Models", 1990 IEEE, pp. 713-723.*
Zhang "Deadlock Avoidance for Flexible Manufacturing Systems With Choices Based on Digraph Circuit Analysis", 2004 IEEE, pp. 3333-3338.*
Shiu et al. "A Novel Parallel Deadlock Detection Algorithm and Architecture", 2001 IEEE, pp. 73-78.*
Datta et al. "Deadlock Detection in Distributed Systems", 1990 IEEE, pp. 131-136.*
C. Boyapati et al., "Ownership Types for Safe Programming: Preventing Data Races and Deadlocks," ACM Conference on Object-Oriented Programming, Systems, Languages, and Applications (OOPSLA-02), Nov. 2002, pp. 211-230.
Compuware Software, "Thread Deadlock Detection for Java," http://www.compuware.com/products/devpartner-/1603_ENG_HTML.htm, 2005, 1 page.
C. DeMartini et al.. "A Deadlock Detection Tool for Concurrent Java Programs," Software-Practice and Experience, Jun. 1999, pp. 577-603, vol. 29, No. 7.
M.E. Mami et al., "Context-Sensitive Interprocedural Points-to Analysis in the Presence of Function Pointers," Proceedings of the ACM SIGPLAN Conference on Programming Language Design and Implementation, Jun. 1994, pp. 242-256.
D. Engler et al., "RacerX: Effective, Static Detection of Race Conditions and Deadlocks," Proceedings of the 19th ACM Symposium on Operating Systems Principles (SOSP'03), Oct. 2003, pp. 237-252.
G.B. Leeman et al., "Detecting Unwanted Synchronization in Java Programs," Tech. Rep. RC 22552, IBM, Computer Science, Sep. 2002, 12 pages.
J.W. Havender, "Avoiding Deadlock in Multitasking Systems," IBM Systems Journal, Avoiding Task Deadlock, 1968, pp. 74-84, vol. 7, No. 2.
G.J. Holzman, "The Model Checker SPIN," IEEE Transactions on Software Engineering, May 1997, pp. 1-17, vol. 23, No. 5.
L. Koved, "JABA—Java Bytecode Analysis," http://www.research.ibm.com/javasec/JaBA-.html, 2001.
L. Koved et al., "Access Rights Analysis for Java," Proceedings of the 17th ACM Conference on Object-Oriented Programming, Systems, Languages, and Applications, (OOPSLA-02), Nov. 2002, 14 pages.
S.P. Masticola et al., "A Model of Ada Programs for Static Deadlock Detection in Polynomial Time," Proceedings of the ACM/ONR Workshop on Parallel and Distributed Debugging, 1991, pp. 97-107.
J.E. Murphy, "Resource Allocation with Interlock Detection in a Multi-Task System," IBM, Fall Joint Computer Conference, 1968, pp. 1169-1176.
G. Naumovich et al., "Data Flow Analysis for Checking Properties of Concurrent Java Programs," Proceedings of the 21st International Conference on Software Engineering, IEEE Computer Society Press/ACM Press, May 1999, 12 pages.
Quest Software, JPROBE Threadalyzer, "Analyze Java Thread Correctness," http:///www.quest.com/jprobe/threadalyzer.asp, 2005.
M. Rinard, "Analysis of Multithreaded Programs," Static Analysis, Lecture Notes in Computer Science, 2001, pp. 1-19, vol. 2126.
R. Tarjan, "Enumeration of the Elementary Circuits of a Directed Graph," SIAM J. Computer, Sep. 1973, pp. 211-216, vol. 2, No. 3.
R.N. Taylor, "A General-Purpose Algorithm for Analyzing Concurrent Programs," Research Contributions, Communications of the ACM, May 1983, pp. 362-376, vol. 26, No. 5.
W. Teitelman, "A Tour Through Cedar," Proceedings of the 7th International Conference on Software Engineering, IEEE Computer Society Press, 1984, pp. 181-195.
A. Williams et al., "Static Deadlock Detection for Java Libraries," MIT Computer Science and Artificial Intelligence Laboratory Research Abstracts, 2005, pp. 602-629.
F. Zeng et al., "Ghost Locks: Deadlock Prevention for Java," Proceedings of the Mid-Atlantic Student Workshop on Programming Language and Systems (MASPLAS), Apr. 2004, pp. 11.1-11.6.

* cited by examiner

FIG. 3

```
Notation: mu(x) = lock set of x (x = node or edge)
         in(x) = initial values of lock sets, based on
                 synchronized methods (x = node edge)
         n = node, e = edge
         p = path, consisting of nodes and basic blocks
         v = empty lock set
         updrg(n, p) = update the resource graph, using node n
                       and path p
Fixed point algorithm (run for each thread):
  1.  Set all mu(x) to v for all call sites and edges, and set the
      resource graph to the empty graph.
  2.  Initialize all structures for nodes with synchronized blocks.
  3.  Initialize all lock sets based on synchronized methods,
      i. e. compute in(x) for nodes and edges
  4.  Push onto the queue the start node and a path = start node.
  5.  while queue is nonempty:
  6.       pop a node n and path p.
  7.       mu(n) <- mu(n) + in(n), updrg(n, p)
  8.       compute lock sets of blocks and edges in n, updrg(n, p)
  9.       for all edges e = (n, s) leaving n:
  10.          mu(e) <- mu(e) + mu(n)
  11.          if s is in the thread's closure set:

12.              t <- mu(s) ∪ mu(e), updrg(s, p s)
  13.              if t != mu(s):
  14.                  mu(s) <- t
  15.                  push s and path p s
```

*FIG. 4*

```
1.  public class Philosopher extends Thread {
2.      private static String chopstick1 = new String( "1" ),
3.          chopstick2 = new String( "2" ),
4.          chopstick3 = new String( "3" ),
5.          chopstick4 = new String( "4" ),
6.          chopstick5 = new String( "5" );
7.      private String leftChopstick, rightChopstick;
8.      private String name;
9.      public Philosopher( String name, String leftChopstick,
10.                         String rightChopstick ) {
11.         this.name = name;
12.         this.leftChopstick = leftChopstick;
13.         this.rightChopstick = rightChopstick;
14.     }
15.     public void run ( ) {
16.         System.out.println( name + " sits at table" );
17.         try {
18.             while( true ) {
19.                 System.out.println( name + " is thinking" );
20.                 pause( );
21.                 System.out.println( name + " wants " + leftChopstick );
22.                 synchronized( leftChopstick ) {
23.                     System.out.println( name + " picks up " + leftChopstick );
24.                     pause( );
25.                     System.out.println( name + "wants " + rightChopstick );
26.                     synchronized( rightChopstick ) {
27.                         System.out.println( name + " picks up "
28.                             + rightChopstick );
29.                         System.out.println( name + "begins eating" );
30.                         pause( );
31.                         System.out.println( name + " finishes eating" );
32.                     }
33.                 }
34.             }
35.         }
36.         catch( InterruptedExeception ie ) {
37.             System.out.println( name + " is interrupted" );
38.     }
39. }
```

FIG. 4 cont.

```
40.    private void pause( ) throws InterruptedException {
41.        Thread.currentThread( ).sleep( ( long ) ( 1000 * Math.random( ) ) );
42.    }
43.    public static void main( String[ ] args ) {
44.        Philosopher
45.            frege  = new Philosopher( "frege", chopstick1, chopstick2 ),
46.            hegel  = new Philosopher( "hegel", chopstick2, chopstick3 ),
47.            kant   = new Philosopher( "kant", chopstick3, chopstick4 ),
48.            mill   = new Philosopher( "mill", chopstick4, chopstick5 ),
49.            plato  = new Philosopher( "plato", chopstick5, chopstick1 );
50.        frege.start( );
51.        hegel.start( );
52.        kant.start( );
53.        mill.start( );
54.        plato.start( );
55.    }
56.}
```

FIG. 5

| OBJECT | INDEX | PC | SL |
|---|---|---|---|
| HEGEL | 1 | 16 | 46 |
| CHOPSTICK2 | 2 | 12 | 3 |
| CHOPSTICK3 | 4 | 24 | 4 |
| MILL | 7 | 48 | 48 |
| CHOPSTICK4 | 8 | 36 | 5 |
| CHOPSTICK5 | 10 | 48 | 6 |
| PLATO | 12 | 65 | 49 |
| CHOPSTICK1 | 14 | 0 | 2 |
| FREGE | 16 | 0 | 45 |
| KANT | 19 | 32 | 47 |

*FIG. 8*

```
1 cycle found.

Cycle 1 locks
   2:  NewSite: Primordial in method: Philosopher.<client>()V at PC: 12 Line: 3
   4:  NewSite: Primordial in method: Philosopher.<client>()V at PC: 24 Line: 4
   8:  NewSite: Primordial in method: Philosopher.<client>()V at PC: 36 Line: 5
  10:  NewSite: Primordial in method: Philosopher.<client>()V at PC: 48 Line: 6
  14:  NewSite: Primordial in method: Philosopher.<client>()V at PC: 0 line: 2

1 path from lock 2 to lock 4

Philosopher.main(Ljava.lang.String;)V calls at line 51
   java.lang.Thread.start()V calls at PC 25
      Philosopher.run()V
         requests lock 2 via call at line 22 to
            synchronized block
               requests lock 4 via call at line 26 to
                  synchronized block 1 path from lock 4 to lock 8

Philosopher.main(Ljava.lang.String;)V calls at line 52
   java.lang.Thread.start()V calls at PC 25
      Philosopher.run()V
         requests lock 4 via call at line 22 to
            synchronized block
               requests lock 8 via call at line 26 to
                  synchronized block 1 path from lock 8 to lock 10

Philosopher.main(Ljava.lang.String;)V calls at line 53
   java.lang.Thread.start()V calls at PC 25
      Philosopher.run()V
         requests lock 8 via call at line 22 to
            synchronized block
               requests lock 10 via call at line 26 to
                  synchronized block
```

FIG. 8 cont.

```
1 path from lock 10 to lock 14

Philosopher.main(Ljava.lang.String;)V calls at line 54
  java.lang.Thread.start()V calls at PC 25
    Philosopher.run()V
      requests lock 10 via call at line 22 to
      synchronized block
          requests lock 14 via call at line 26 to
          synchronized block 1 path from lock 14 to lock 2

Philosopher.main(Ljava.lang.String;)V calls at line 50
  java.lang.Thread.start()V calls at PC 25
    Philosopher.run()V
      requests lock 14 via call at line 22 to
      synchronized block
          requests lock 2 via call at line 26 to
          synchronized block
```

FIG. 9

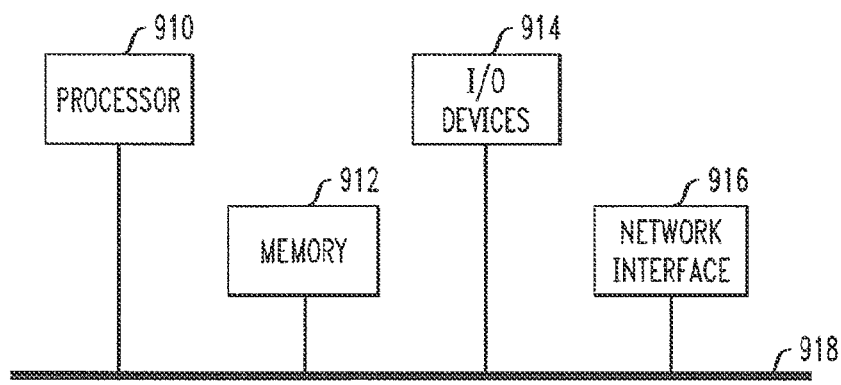

METHODS AND APPARATUS FOR DETECTING DEADLOCK IN MULTITHREADING PROGRAMS

CROSS-REFERENCE TO RELATED APPLICATIONS

This application is a Continuation of U.S. patent application Ser. No. 12/056,646, filed on Mar. 27, 2008, now U.S. Pat. No. 8,230,437, which is a Continuation of U.S. patent application Ser. No. 11/315,855 filed on Dec. 22, 2005, which is abandoned, the disclosures of which are fully incorporated herein by reference.

FIELD OF THE INVENTION

The present invention relates generally to multithreading programs and, more particularly, to techniques for detecting deadlock in multithreading programs.

BACKGROUND OF THE INVENTION

Deadlock is a pernicious condition in which multiple processes are prohibited from making progress, because each is waiting for one or more resources that are being used by some other process. However, deadlock is difficult to detect because it may occur only under specific conditions involving, for example, the interleaving or timing of the executing threads.

In a simple example of deadlock, an operating system contains two files, file1 and file2. Two concurrently running processes, thread1 and thread2, both require file1 and file2 to complete successfully. If thread1 opens file1, and thread2 opens file2, deadlock may result when thread1 attempts to open file2 before closing file1, and thread2 attempts to open file1 before closing file2. Thus, the two processes could wait forever.

Several authors have provided characterizations of deadlock through the application of fundamental assumptions regarding concurrently running threads that require various resources, see, for example, W. W. Collier, "System Deadlocks," Tech. Rep. TR-00.1756, IBM Systems Development Division, New York, 1968; J. W. Havender, "Avoiding Deadlock in Multitasking Systems," IBM Syst. J. 7, 2 (1968), pp. 74-84; J. E. Murphy, "Resource Allocation with Interlock Detection in a Multi-Task System," In Proc. FJCC, AFIPS (1968), vol. 33; and A. Shoshani et al., "Prevention, Detection, and Recovery from System Deadlocks," In Proceedings of the Fourth Annual Princeton Conference on Information Sciences and Systems (March 1970).

Three such fundamental assumptions that may be made about concurrently running threads include:

1) Mutual exclusion—threads claim exclusive control of the resources they require;

2) Wait for—threads hold resources already allocated to them, and must await additional required resources; and 3) No preemption—resources cannot be forcibly removed from the threads holding them until the resources are used to completion.

In the context of the Java™ language (Sun Microsystems, Inc.), the three fundamental assumptions described above are satisfied and the resources of interest are locks.

When these fundamental assumptions hold, deadlock may be characterized by a resource graph, see, for example W. W. Collier; J. W. Havender; J. E. Murphy; and A. Shoshani et al. A graph is defined as a pair (N, E), where N is a set of nodes and E is a set of edges. If there are n distinct resources, the graph has n nodes, with each node representing a single resource. Each edge is of the form (v, w), where v∈N and w∈N. Edge (v,w) extends from node v to node w if there exists a thread with an execution path that acquires resource v and subsequently requests resource w. A path in a graph is a set $\{(v_i, v_{i+1}) | i=1, \ldots n\}$ of edges, where $n \geq 1$. A cycle is a path in which $v_1, \ldots, v_n$ are all distinct, and $v_{n+1} = v_1$.

Assuming that a thread does not request a resource it has already acquired, if deadlock occurs, then the resource graph contains at least one cycle. In the context of programming languages, such as Java™, the use of the graph may be termed a lock cycle strategy, because of the search for cycles of lock acquisitions and requests.

Therefore it would be desirable to automatically determine whether deadlock will occur through source and object code of a multithreading program without having to execute the code of the multithreading program.

SUMMARY OF THE INVENTION

In multithreading languages such as Java™, deadlock is a serious condition that should be avoided for proper program functioning. The embodiments of the present invention that detect deadlock in Java™ byte code are automatic and do not require any annotation of the byte code. The presence of deadlock is reported precisely, and a user may examine the output to determine if the code needs to be modified. Thus, static analysis techniques may be utilized in accordance with the embodiments of the present invention.

For example, in one aspect of the present invention, a method of detecting deadlock in a multithreading program is provided. An invocation graph is constructed having a single root and a plurality of nodes corresponding to one or more functions written in code of the multithreading program. A resource graph is computed in accordance with one or more resource sets in effect at each node of the invocation graph. It is determined whether cycles exist between two or more nodes of the resource graph. A cycle is an indication of deadlock in the multithreading program.

Additionally, the resource graph may be constructed through the construction of a set of nodes and edges in accordance with the resource sets in effect at each node of the invocation graph. A definition of the resource graph may be refined through post-processing to generate additional edges. Finally, any cycles may be reported to a user with associated path information.

The approach of the present invention includes detailed reporting at both the interprocedural and intraprocedural level allowing for the clear identification of resource contention locations. The method is general in that it works on a resource cycle strategy through an abstract description of the program involving graphs and not details of the programming language. Thus, the embodiments of the present invention may be applied to any language which implements monitors and may be scaled to large problems.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a lock set construction methodology, according to an embodiment of the present invention;

FIG. 4 is Java™ code for an example used to illustrate an embodiment of the present invention;

FIG. 5 is a table of indices, program counters and source line numbers for the example used to illustrate an embodiment of the present invention;

FIG. 8 is output produced for the example used to illustrate an embodiment of the present invention; and FIG. 9 is a block diagram illustrating an exemplary hardware implementation of a computing system in accordance with which one or more components/methodologies of the invention may be implemented, according to an embodiment of the present invention.

DETAILED DESCRIPTION OF PREFERRED EMBODIMENTS

As will be illustrated in detail below, the present invention introduces techniques for detecting deadlock in multithreading programs. The embodiments of the present invention may be implemented for any multithreading program implementing monitors, however, for illustrative purposes they are described herein as applied to a Java™ program.

The embodiments of the present invention may be utilized for both source code and byte code. In the former case, the source code is compiled and the approach is applied to Java™ archive (jar) files containing the byte code. In the latter case, the methodology may be applied even if the source code is unavailable, which may frequently occur. The embodiments are automatic, and no annotation of the code is required. The jar files are input to the system along with some configuration data, and the output is a report that includes a summary of potential deadlocks.

The Java™ language makes use of monitors, which protect a body of code by ensuring that it can be executed only a single thread at a time. This is achieved through the use of a lock that is implicitly associated with each Java™ object. Thus, as described above and in accordance with the embodiments of the present invention, a resource graph is termed a lock graph. In order to begin construction of a lock graph, a Java™ program is provided, which consists of several sets of byte code.

Figure 1:
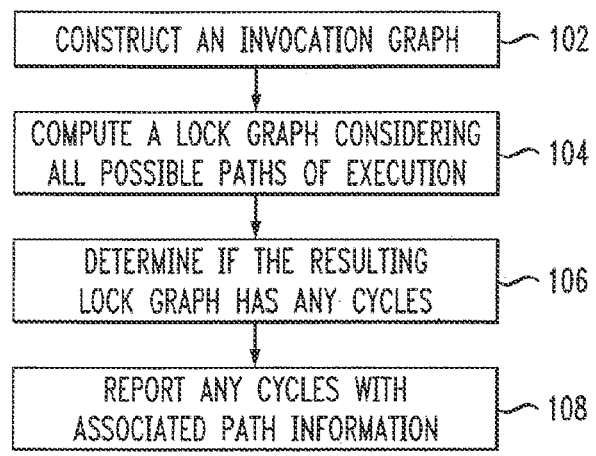
FIG. 1 is a flow diagram illustrating a deadlock detection methodology, according to an embodiment of the present invention.

Referring initially to FIG. 1, a flow diagram illustrates a high-level deadlock detection methodology, according to an embodiment of the present invention. The methodology begins in block 102 in which an invocation graph is constructed having a single root, or relevant entry point. In block 104, a lock graph is computed, considering all possible paths of execution from the root to the sources where a resource is acquired or requested. Path information is retained for reporting purposes. In block 106, it is determined if the resulting lock graph has any cycles. In block 108, any cycles are reported to the user, with associated path information.

In preferred embodiments of the present invention a Java™ byte code analysis (JaBA) system is utilized, which uses static analysis techniques to build an invocation graph for the methods, or functions written in the Java™ byte code. JaBA also generates information about values of variables and locks. The system is flow sensitive in that each method's control flow graph considers the order of execution of the instructions within each basic block, accounting for local variable kills and casting of object references. The system is also context sensitive, because each node in the invocation graph is uniquely identified by its calling context, namely, the method, a set of possible receiver types, and possible parameter types.

Each node of the invocation graph represents a method and a particular context and contains the basic blocks of the method's control, flow graph and locations where locks are accessed or released. The invocation graph also has an interprocedural edge (A, B), representing the invocation of method B from within method A. The edge extends from the instruction in A where the invocation takes place to the initial vertex of the control flow graph of B. The invocation graph of the present invention allows bidirectional traversal, even though the edges in the graph are unidirectional. Therefore, from any node n within the invocation graph, the sets of its predecessor nodes and successor nodes may be found.

In addition to the invocation graph, a data flow analysis is performed with precision to the level of allocation sites, where each allocation is uniquely identified. The number of objects in a Java™ program as modeled by the invocation graph is always finite There are a finite number of calls in the object code, and the elements of arrays and other collections are modeled as single elements. JaBA also produces a file indicating all the classes examined and their hierarchical relationships.

As described above, a lock graph is given by (N, E). Each element of N is a set of locks corresponding to objects in the Java™ program. Let v∈N and w={$w_1, w_2, \ldots, w_m$}∈N, then if there exists an execution path in the program for which a thread has acquired at least the set of locks v and requests the set w, then (v,$w_i$)∈E,i=1, ..., m.

If the Java™ program has n locks, then in theory there are $2^n$ nodes, corresponding to all possible subsets of the n elements. However, isolated nodes, nodes with no edges leaving or entering them, may be ignored. In practice, the graph is constructed incrementally, adding lock sets and edges as they arise in the traversal of the program paths, and the number of nodes is far less than the theoretical maximum.

Figure 2:
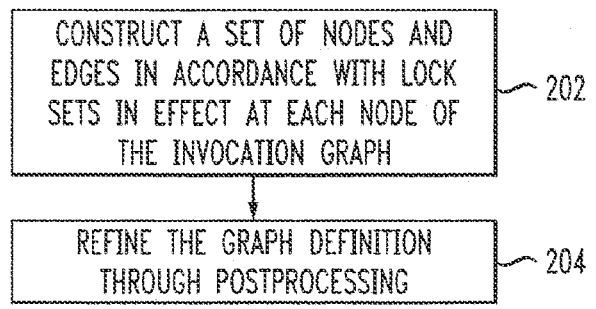
FIG. 2 is a flow diagram illustrating lock graph computation methodology, according to an embodiment of the present invention.

Referring now to FIG. 2, a flow diagram illustrates a lock graph computation methodology, according to an embodiment of the present invention. This may be considered a detailed description of block 104 in FIG. 1. Construction of the lock graph takes place in two stages. In block 202, a set of nodes and edges are constructed in conjunction with a lock set calculation algorithm that is described in, for example, G. B. Leeman et al., "Detecting Unwanted Synchronization in Java Programs," Tech. Rep. RC 22552, IBM Thomas J. Watson Research Center, Yorktown Heights, N.Y., September 2002. The lock graph computation utilizes calculated lock sets in effect at each node of the invocation graph and within each basic block to construct a set of nodes and edges in the lock graph, as will be described in more detail below. In block 204, a second step, termed post-processing, refines the graph definition.

A lock is defined as a pair (o,c), where o is an object in the Java™ program and c, the counter, is a positive integer bounded by a fixed constant Ω. A lock set is a collection of locks in which all the objects o are distinct. In the invocation graph model of a Java™ program, the total number of Java™ objects is finite. Hence the number of different possible lock sets for that program is finite.

Given a lock set m, plus (+) is defined, corresponding to monitorenter, as follows:

if (o, c)∈m for some c, (o, c) in m is replaced by (o, min(c+1, Ω));

otherwise, add (o, 1) to m.

The resulting set is m+o.

For the union (∪) of a set m with a lock (o, c), if o does not appear in any lock object of m, add (o, c) to m;

if (o, d)∈m with d<c, replace (o, d) by (o, c) in m;

if ((o, d)∈m with d=c, m remains unchanged.

The resulting set is m ∪ (o, c).

The + and ∪ are extended to operations on two sets $m_1$ and $m_2$ by computing $m_1$(+ or ∪ for each o∈$m_2$.

In practice the use of counters rarely arises in bytecode. Therefore, a condition of Ω=1 may be set.

The union operation expresses the fact that an invocation graph node successor inherits the lock sets of its predecessors: if node i has lock set $m_i$, i=1, 2, and node 2 is a successor of node 1, then at some point in the computation $m_2$ will be replaced by $m_1 ∪ m_2$.

Referring now to FIG. 3, a lock set construction methodology is provided, according to an embodiment of the present invention. This may be considered a detailed description of block 202 in FIG. 2. Within this fixed-point algorithm, nodes and edges refer to parts of the invocation graph. This methodology is performed for each thread in the Java™ program; the start node is the thread's start( ) method, and first a thread closure set is formed with all nodes reachable from its start( ) node.

The first four steps of the methodology are initializations. Step 1 initializes the empty lock sets and empty graphs. Step 2 initializes all structures for nodes with synchronized blocks, which records which basic blocks contain monitorenters and monitorexits. Step 3 initializes all lock sets based on synchronized methods, and more specifically, computes initial values of lock sets for nodes and edges based on synchronized methods. Step 4 places the starting values into the queue. The "empty" lock graph actually has one node (node 0) representing the empty lock set.

A main loop is provided in steps 5-15 of the methodology. The current lock set is calculated in step 7, and the lock graph is updated, if necessary. Whenever new locks are requested, new vertices and edges may be added. Step 8 performs intra-procedural analysis to determine the lock sets of basic blocks and edges, see, for example, G. B. Leeman et al. Again, this step may necessitate updating of the lock graph. Finally, steps 9-15 perform interprocedural analysis to compute lock sets for each edge leaving the current node, step 10. If the lock set of the successor node is changed, steps 11-14, the successor is added to the current path, and they are placed onto the queue step 15. The paths are kept by the lock graph for, reporting purposes.

The refining of the graph definition through post-processing as described in block 204 of FIG. 2, involves the examination of a current set of vertices to generate additional edges. Recall that the first stage ran on each thread, perhaps producing new lock graph nodes and edges. If thread t produces an edge (p(t), s(t)), then some execution path acquires at least the locks in the predecessor set p(t) and requests the lock in the successor set s(t). Similarly, suppose a second thread t' produces an edge (p(t'), s(t')). The condition p(t) ∩p(t')≠φ expresses a situation that cannot occur, because Java™ threads and locks satisfy the mutual exclusion property. However, if p(t) ∩p(t')=φ, then additional edges may be created which may be of interest. Namely, for each lock m in p(t) a new node {m} is created (unless this node already exists) and edge from {m} to s(t) (unless such an edge already exists); the analogous operation is performed for p(t'). Thus, block 204 consists of pair wise inspection of threads and creation of additional nodes and edges via this process.

A classic dining philosophers problem may be used to illustrate the embodiments of the present invention, see, for example, A. Silberschatz et al., "Operating System Concepts," sixth ed., John Wiley & Sons, Inc., New York, N.Y., 2002. Referring now to FIG. 4, Java™ code is shown for the classic dining philosophers problem having four philosophers and five chopsticks, in which two chopsticks (resources) are required for the philosophers to eat, eventually leading to deadlock.

Lines 44-49 of the Java™ code of FIG. 4 create the five philosopher objects, and the three arguments indicate the philosopher's name, the chopstick to his left, and the chopstick to his right, respectively. The chopsticks are expressed via strings in lines 2-6. Each philosopher is also a thread (line 1), and the threads are started in lines 50-54, which cause the run method (lines 15-39) to be executed. This method models each philosopher's behavior: he sits between two chopsticks allocated to him (line 16) and then enters a thinking-picking-eating loop (lines 18-34), where each action takes a random amount of time. In that loop he thinks (lines 19-20), picks up his left chopstick (lines 21-24), picks up his right chopstick (lines 25-28), and eats (lines 29-33). Java™ synchronization blocks mirror the chopsticks' mutual exclusion, wait for, and no preemption properties. When this program is run, deadlock is quickly reached.

In accordance with the embodiments of the present invention, through JaBA, objects are represented via a list of the form of:

index type class method programCounter sourceLine

For example, the chopstick1 object is represented as:

14 NewSite Philosopher

Philosopher.main([java.lang.String])

PC 0 SL 2

Figure 6:
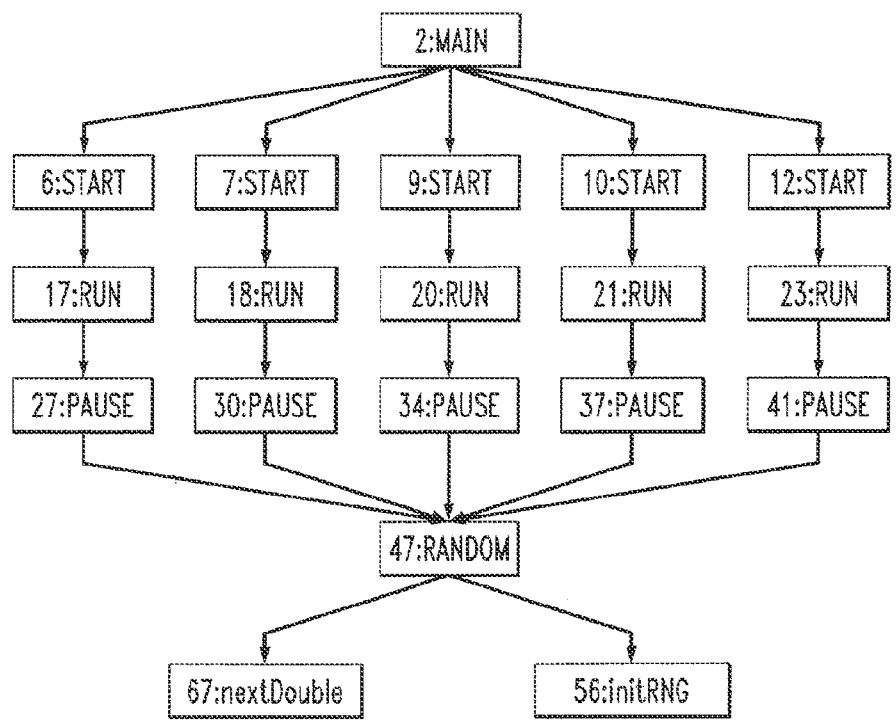
FIG. 6 is a portion of an invocation graph for the example used to illustrate an embodiment of the present invention.

The index is a unique number assigned to each object. If source code is not available, the source line entry is −1. The important objects in the dining philosophers problem all have the same type, class, class loader, and method. The indices, program counters, and source line numbers are shown in the table of FIG. 5. Additionally, a portion of the invocation graph for the dining philosophers example is shown in FIG. 6. The example provided has 11 locks (5 philosophers, 5 chopsticks, and a Math lock), but there are far fewer than $2^{11}$ nodes, specifically, 22 nodes and 40 edges.

Figure 7:
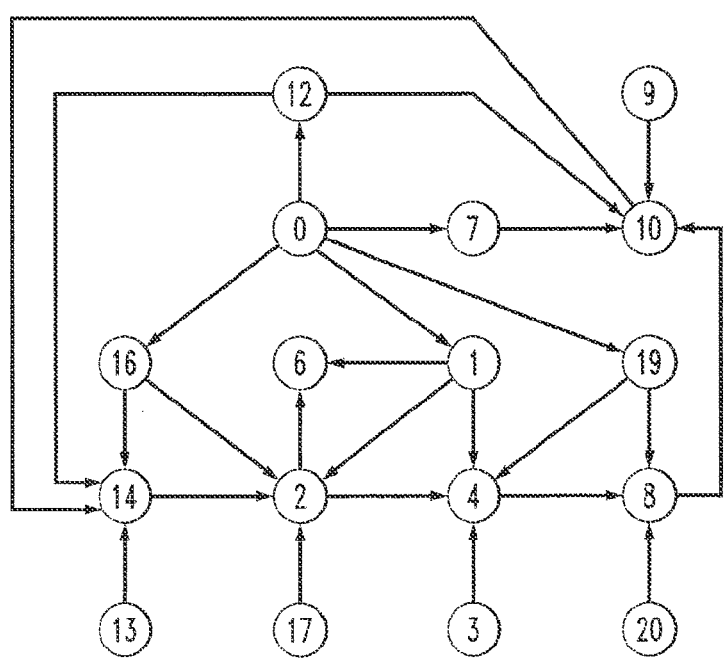
FIG. 7 is lock graph for the example used to illustrate an embodiment of the present invention.

The progress of the first stage may be traced for the dining philosophers example. There are five start nodes (lines 50-54) where the methodology of FIG. 3 is applied. Note that start( ) is actually of the form:

public synchronized native java.lang.Thread.start and thus for each start node, step 7 of FIG. 3 causes the creation of nodes 16, 1, 19, 7, and 12 in a lock graph, which is illustrated in FIG. 7, according to the embodiment of the present invention. These integers correspond to the objects' indices in the table of FIG. 5. Additionally, the five edges:

(0, 1), (0, 7), (0, 12), (0, 16), (0, 19)

are formed, which say that a thread acquires at least no locks (node 0) and requests a single lock to run the start method.

The successor of start( ) is the run method. The processing of line 22 of FIG. 4 by Step 8 of FIG. 3 causes the creation of new lock graph nodes 14, 2, 4, 8, and 10 in the lock graph of FIG. 7 corresponding to the five chopstick objects in the table of FIG. 5. There are also new edges:

(16, 14), (1, 2), (19, 4), (7, 8), (12, 10), in particular from line 45 (16, 14) says that start( ) acquires at least the frege lock (16) and then requests the chopstick1 lock

(14) at line 22. Similarly, when line 26 is analyzed, new lock sets and Java™ lock graph nodes:

17={16, 14}, 3={1, 2}, 20={19, 4}, 9={7, 8}, 13={12, 10} are created, followed by edges:

(17, 2), (3, 4), (20, 8), (9, 10), (13, 14), for example, after acquiring at least the frege and chopstick1 locks ({16,14}, set to 17), chopstick2 (2) is requested, resulting in edge (17, 2).

Often unexpected nodes will be generated because of the signatures of various built-in methods. In our example the random method (line 41) calls initRNG that has signature:

private static synchronized
java.lang.Math.initRNG( )V}

Therefore, there is a new lock consisting of the class object for the Math class, and a lock set with three elements (a philosopher, chopstick, and the Math lock) will be generated, along with additional nodes and edges. However, since they are of less interest, they have not been discussed.

Block 204 of FIG. 2 does not create any new vertices. However, the philosopher frege thread produces edge (17, 2), and the philosopher hegel thread produces edge (3, 4). The sets 17 and 3 are disjoint, so block 402 proposes new edges ({16}, 2), {{14}, 2), ({1}, 4), and ({2,} 4), which in our notation is the same as (16, 2), (14, 2), (1, 4), and (2, 4). Edge (1, 4) already exists, but the other three are new. It is not difficult to determine that philosophers kant and mill produce new edges (4, 8), (7, 10), (8, 10), and philosopher plato plus any other philosopher object yield two new edges (10, 14) and (12, 14). Still more edges arise from the lock sets with three elements, which are not addressed in this illustrative example.

In the dining philosophers example, exactly one cycle is found:

2→4→8→10→14→2

An example of the output produced for the dining philosophers example in accordance with the embodiments of the present invention is provided in FIG. 8.

When the Java™ lock graph has cycles, information is reported, and the user may use this information to determine if deadlock is present. Because static analysis often produces false positives, each output collection must be examined. When the graph has no cycles, that condition is strong evidence for absence of deadlock. The user may be able to look at the threads analyzed to see the deadlock is not present. In general, static analysis cannot traverse all possible program executions, and in Java™ dynamic features such as reflection exacerbate the problem.

A simple example of a two-way deadlock is provided in D. Lea, "Concurrent Programming in Java Design Principles and Patterns," Addison-Wesley, Reading, Mass., 1997. See also, C. Demartini et al. "A Deadlock Detection Tool for Concurrent java Programs," Software-Practice and Experience 29, 7, June 1999, pp. 577-603. However these references provide a relatively complicated analysis. The embodiments of the present invention provide a particularly simple analysis, by generating a lock graph with only 7 nodes, 10 edges, and 1 cycle. Exactly two nodes v and w have the property that both (v, w) and (w, v) are edges, giving rise to the cycle and the deadlock. Although the embodiments of the present invention have been illustrated in the context of analyzing Java™ code, they may be applied to any language that supports monitors.

Referring now to FIG. 9, a block diagram illustrates an exemplary hardware implementation of a computing system in accordance with which one or more components/methodologies of the invention (e.g., components/methodologies described in the context of FIGS. 1-8) may be implemented, according to an embodiment of the present invention.

As shown, the computer system may be implemented in accordance with a processor 910, a memory 912, I/O devices 914, and a network interface 916, coupled via a computer bus 918 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, video camera, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The embodiments of the present invention described herein provide an automatic method to detect deadlock in languages that Support the monitor concept to achieve synchronization. It works for both source code and byte code, because the former may be compiled into the latter, which is analyzed. No code annotations are required.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting deadlock in a multithreading program, comprising the steps of:
   constructing an invocation graph having a single root and a plurality of nodes corresponding to one or more functions written in code of the multithreading program;
   computing a resource graph in accordance with one or more resource sets in effect at each node of the invocation graph, wherein computing a resource graph comprises constructing a set of nodes and edges in accordance with the resource sets in effect at each node of the invocation graph, and refining a definition of the resource graph through post-processing; and
   determining whether cycles exist between two or more nodes of the resource graph, wherein a cycle is an indication of deadlock in the multithreading program,
   wherein constructing, computing and determining are operations that are performed by a computer.

2. The method of claim 1, wherein the multithreading program comprises a Java™ program.

3. The method of claim 1, wherein, in the step of constructing an invocation graph, each node comprises basic blocks of a control flow graph of a function written in the code of the multithreading program and locations where resources are accessed and released.

4. The method of claim 1, wherein, in the step of constructing an invocation graph, each edge connecting two nodes corresponds to an invocation of a function written in the code of the multithreading program from within another function written in the code of the multithreading program.

5. The method of claim 1, wherein, in the step of constructing an invocation graph, the invocation graph allows for bidirectional traversal between nodes to determine sets of predecessor nodes and successor nodes.

6. The method of claim 1, wherein, the step of constructing an invocation graph comprises the step of performing a data flow analysis.

7. The method of claim 1, wherein, in the step of constructing an invocation graph, each node in the invocation graph is identifiable by a calling context.

8. The method of claim 7, wherein the calling context comprises at least one of a target function, a set of possible receiver types, and parameter types.

9. The method of claim 1, wherein, in the step of computing a resource graph, a resource comprises an object and a counter, and a resource set comprises resources having distinct objects.

10. The method of claim 1, wherein the step of constructing a set of nodes and edges comprises the steps of:
calculating a first resource set from the invocation graph;
adding edges as resources are requested;
computing resource sets for each edge leaving a node of the first resource set;
updating the resource graph as required after each step; and
repeating the calculating, adding, computing and updating steps for each newly created resource set.

11. The method of claim 1, wherein the step of refining a definition of the lock graph comprises the step of examining a current set of vertices to generate additional edges.

12. The method of claim 1, further comprising the step of reporting any cycles with associated path information.

13. Apparatus for detecting deadlock in a multithreading program, comprising:
a memory; and
at least one processor coupled to the memory and operative to:
construct an invocation graph having a single root and a plurality of nodes corresponding to one or more functions written in code of the multithreading program;
compute a resource graph in accordance with one or more resource sets in effect at each node of the invocation graph, wherein computing a resource graph comprises constructing a set of nodes and edges in accordance with the resource sets in effect at each node of the invocation graph, and refining a definition of the resource graph through post-processing; and
determine whether cycles exist between two or more nodes of the resource graph, wherein a cycle is an indication of deadlock in the multithreading program.

14. The apparatus of claim 13, wherein the multithreading program comprises a Java™ program.

15. The apparatus of claim 13, wherein, in the operation of constructing an invocation graph, each node comprises basic blocks of a control flow graph of a function written in the code of the multithreading program and locations where resources are accessed and released.

16. The apparatus of claim 13, wherein, in the operation of constructing an invocation graph, each edge connecting two nodes corresponds to an invocation of a function written in the code of the multithreading program from within another function written in the code of the multithreading program.

17. The apparatus of claim 13, wherein, in the operation of constructing an invocation graph, the invocation graph allows for bidirectional traversal between nodes to determine sets of predecessor nodes and successor nodes.

18. The apparatus of claim 13, wherein, in the operation of constructing an invocation graph, each node in the invocation graph is identifiable by a calling context.

19. An article of manufacture for detecting deadlock in a multithreading program, the article of manufacture comprising a non-transitory machine readable storage medium containing one or more programs which when executed implement the steps of:
constructing an invocation graph having a single root and a plurality of nodes corresponding to one or more functions written in code of the multithreading program;
computing a resource graph in accordance with one or more resource sets in effect at each node of the invocation graph, wherein computing a resource graph comprises constructing a set of nodes and edges in accordance with the resource sets in effect at each node of the invocation graph, and refining a definition of the resource graph through post-processing; and
determining whether cycles exist between two or more nodes of the resource graph, wherein a cycle is an indication of deadlock in the multithreading program.

* * * * *